United States Patent
Leaman

[11] Patent Number: 5,999,686
[45] Date of Patent: Dec. 7, 1999

[54] FIBER OPTIC LIGHTING SYSTEM WITH LOCKABLE SPOT LIGHTS

[75] Inventor: William Leaman, Roanoke, Va.

[73] Assignee: Lightly Expressed, Ltd., Salem, Va.

[21] Appl. No.: 08/970,437

[22] Filed: Nov. 14, 1997

[51] Int. Cl.[6] .................................................. F21V 8/00
[52] U.S. Cl. ........................... 385/147; 385/901; 362/219
[58] Field of Search ................................... 385/901, 147; 362/125, 219, 220, 238, 240, 250, 552, 341

[56] References Cited

U.S. PATENT DOCUMENTS

| | | | |
|---|---|---|---|
| 1,071,957 | 9/1913 | Rawson | 285/270 |
| 1,772,284 | 8/1930 | Johansson | 248/324 |
| 3,912,918 | 10/1975 | Feinbloom | 240/1.4 |
| 4,665,529 | 5/1987 | Baer et al. | 372/107 |
| 5,000,535 | 3/1991 | Churchill | 350/96.2 |
| 5,050,047 | 9/1991 | Viner et al. | 362/552 |
| 5,268,977 | 12/1993 | Miller | 385/33 |
| 5,303,125 | 4/1994 | Miller | 362/32 |

OTHER PUBLICATIONS

Advertisement "Pinpoint Fiber Optics", No date given.
Advertisement "Fiber Optic Double Light Bar Series" No date given.

Primary Examiner—John D. Lee
Assistant Examiner—Juliana K. Kang
Attorney, Agent, or Firm—Whitham, Curtis & Whitham

[57] ABSTRACT

A fiber optic lighting system with a light bar configuration includes a plurality of individual spot lights selectively spaced along the light bar housing. The light bar is hollow and houses a plurality of coiled fiber optic bundles. Individual spot lights are formed by a bundle of fibers collected in a casing fitted with a rotatable ball. A locking cage surrounds the rotating ball. To position a spot light, the locking cage is loosened and the light is rotated into position. Then, the locking cage is tightened so as to securely grip the rotating ball. The locking cage prevents unintended movement of the spot light from a preferred direction. In a preferred embodiment, the locking cage includes a cap which has a threaded fitting arrangement with a base affixed to the light bar housing, and the cap is freely translatable on the base simply by screwing and unscrewing. Wash lighting might be provided additional fibers which project through openings and are cut flush with the housing.

15 Claims, 2 Drawing Sheets

FIBER OPTIC LIGHTING SYSTEM WITH LOCKABLE SPOT LIGHTS

BACKGROUND OF THE INVENTION

1. Field of the Invention

The invention is generally related to a fiber optic illumination system, and more particularly to an elongated hollow housing which routes fiber optic bundles to selectively spaced holes where the light emitting ends are secured in a manner to promote a specific light pattern.

2. Description of the Prior Art

In recent years fiber optics have become increasingly popular in a variety of fields including communications, computers, and general illumination. Fiber optic cables or strands are capable of delivering a light signal from a remote location with very little attenuation of light energy. This capability allows fiber optics to be used in a variety of display and illumination applications. There are several advantages to using fiber optic strands and cables in illumination systems. For example, a single light source can be used to provide multiple, directed points of light, thus reducing the need for multiple light sources. In addition, the light source is remote from the subject matter being illuminated, thereby reducing the effects of heat on the subject matter which often results when the source of light is in close proximity.

U.S. Pat. No. 5,268,977, Miller, discloses a tubular housing having a macro lens at one end and an axially slidable optical fiber at the other. Light emitted from the optical fiber may be focused by axially sliding the optical fiber toward or away from the lens.

U.S. Pat. No. 5,050,047, Viner et al., discloses a fiber optic light bar having a plurality of longitudinally spaced spotlights. Each spotlight is composed of a fiber optic bundle end, secured by a spherical casing and having a lens which is slidably movable toward or away from the fiber optic bundle end for the purpose of focusing the emitted light.

U.S. Pat. No. 5,000,535, Churchill, discloses a fiber optic light bar which includes, a plurality of fiber optic bundles secured in collars, and mounted through a plurality of holes at the surface of the bar, and a plurality of flexible sleeves extending outwardly from the light bar containing fiber optic bundles which emit light.

SUMMARY OF THE INVENTION

It is an object of this invention to provide a fiber optic lighting system with spotlights capable of being aimed in a desired direction and locked in place to prevent drift of the spotlights from the desired direction.

It is another object of this invention to provide a fiber optic lighting system which provides lockable spotlights in combination with wash lighting.

According to the invention, a housing of any desired shape or size includes a plurality of optical fibers therein. Some of the fibers or "strands" are directed through rotatable elements which project from the housing, while other fibers are cut flush with the housing surface. Preferably, several optical fibers are collected together in a bundle (e.g., 30–60 strands) and the bundle is directed through the rotatable element to achieve a spot light function. The rotatable elements are maintained within a lockable cage on the surface of the housing. The lockable cage is adjusted by the user or installer to selectively allow free movement of the rotatable elements therein to achieve aiming of the fiber optic bundles for spot light purposes, and is locked in place after aiming so that the spot light will not drift from its intended illumination direction. In the preferred embodiment, the rotatable elements are spherical, and the lockable cage includes cap and base units which translate relative to one another. However, it will be understood to those of skill in the art that the rotatable elements can be any geometric shape, and that the cage can assume a variety of configurations.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
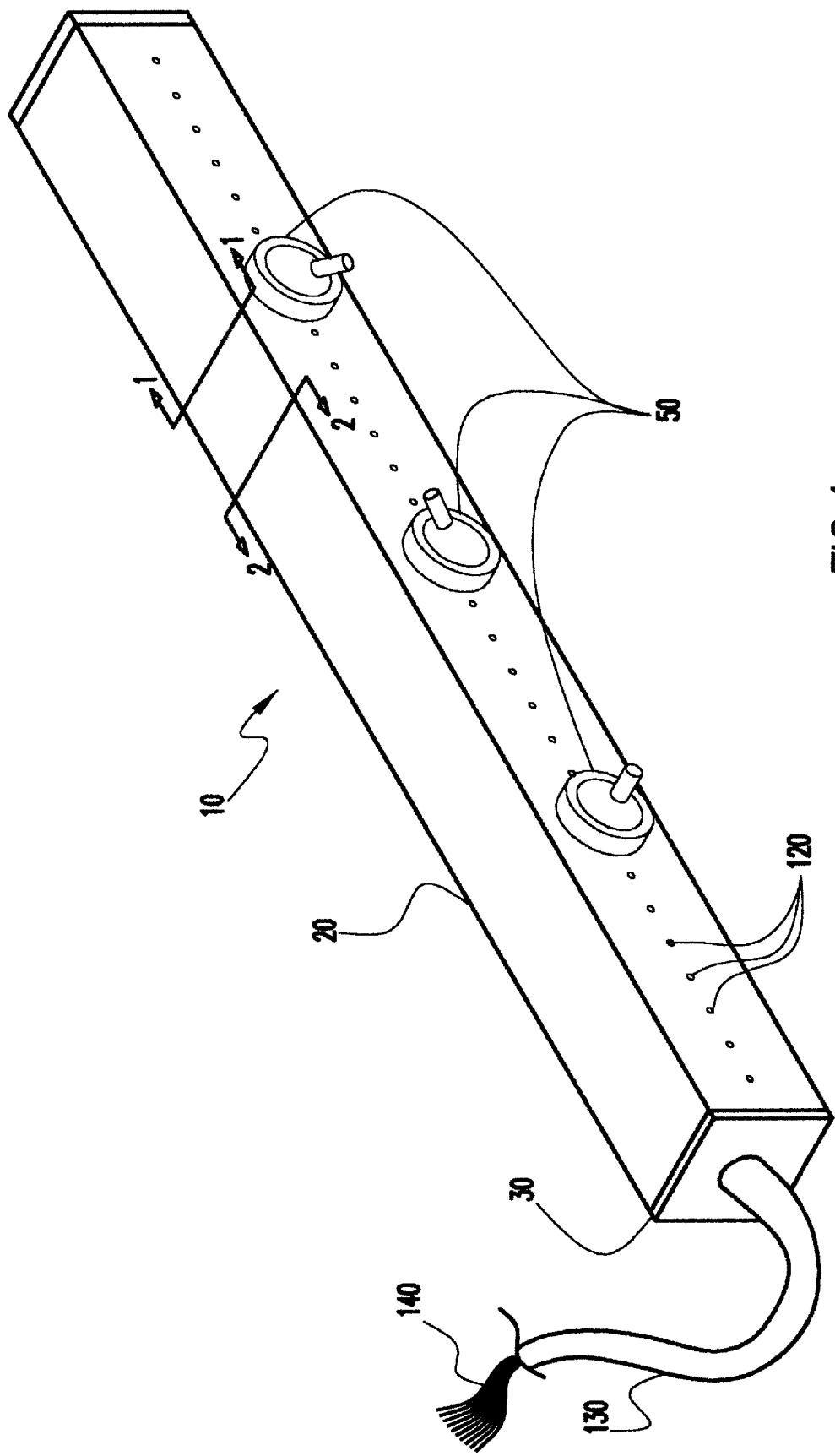
FIG. 1 is an isometric view of a light bar with spot lights and wash lighting.

FIG. 1 shows a lighting assembly 10 which includes wash lighting nodes 120, spot light assemblies 50, housing 20, and end caps 30. A plurality of fiber optic strands 140 are bundled to form a fiber optic bundle 130 which enters the housing 20 of lighting assembly 10 through the end cap 30. Some fiber optic strands 140 from fiber optic bundle 130 are connected to the spot light assemblies 50 contained by housing 20. The remaining fiber optic strands 140 are used to form the wash lighting 120.

To accommodate space constraints or extra lighting needs the housing 20 may be lengthened or shortened thereby accepting differing numbers of spot light assemblies 50 or wash lighting nodes 120. Also housing 20 can be manufactured in a variety of cross-sectional shapes, in separate pieces, and in forms other than light bars to accommodate lighting, display, and other functional and/or aesthetic requirements. Once installed, Light from a single or multiple light sources (not shown) is directed through the fiber optic strands 140 and out the spot light assemblies 50 and wash lighting nodes 120. The invention is not limited to any specific light source and it is contemplated that incandescent lighting, light emitting diodes, mercury arc lamps, and other light sources could be used. In addition, colored lighting may also be used. In some applications, multiple light sources may be used to achieve a desired illumination effect. For example, red, white and blue light might project from separate spot light assemblies 50 of the lighting assembly 10 of FIG. 1 by using separate red light, blue light, and white sources (not shown) which are associated only with fiber optic strands 140 directed to a specific spot light assembly 50.

Figure 2:
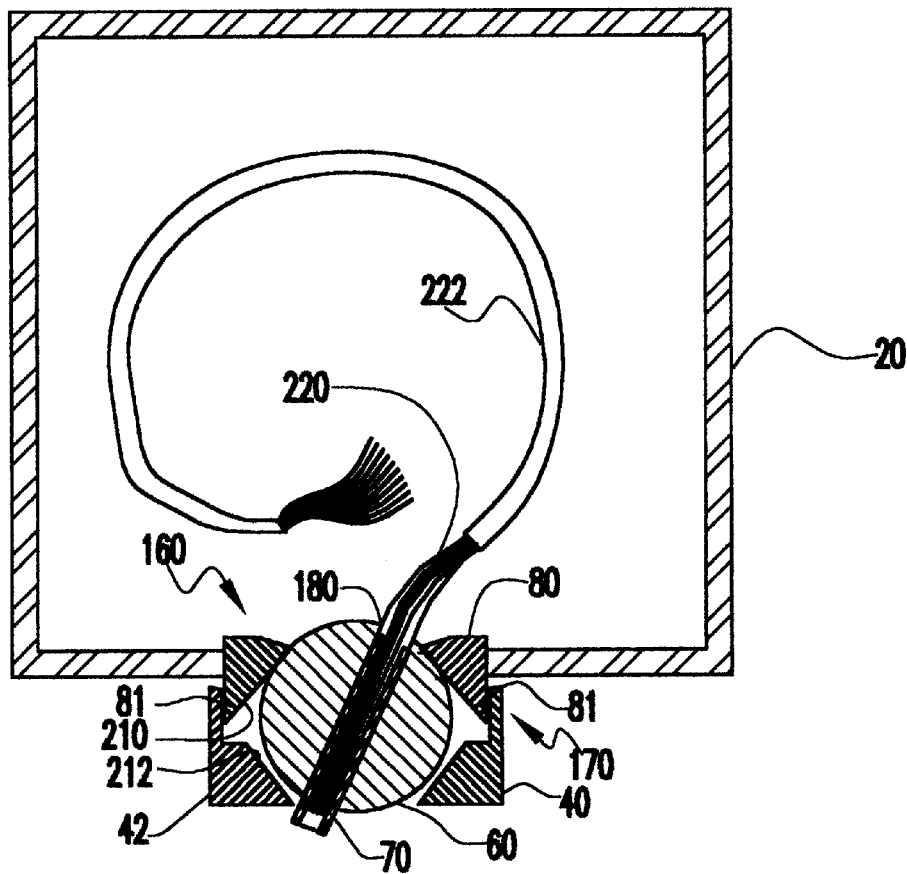
FIG. 2 is a cross-sectional view of the light bar of FIG. 1 taken along line 1—1.

FIG. 2 shows a spot light assembly 50 includes a spot light 160 and a locking cage 170. Spotlight 160 comprises fiber optic strands 220 secured in place by a tubular case 70 which is in turn affixed in the through bore 180 of a rotatable element 60. Rotatable element 60 is selectively held in a desired orientation so as to point the fibers in the tubular case for spot light purposes by locking cage 170. The locking cage 170 is comprised of a locking cap 40 and a base 80. The tubular case 70 can have a cross-section other than circular to achieve functional and or aesthetic effects (e.g., it can be rectangular, star-shaped, or have some other cross-section). The fiber optic strands 220 used in each spotlight are a subset of the optical fiber strands 140 that compose fiber optic cable 130. For most lighting applications thirty to sixty optical fiber strands 220 (most preferably forty to fifty) having a thickness of approximately 0.02 inches are clamped in a case 70 for each spotlight assembly 50. However, it will be clear to those of skill in the art that the number of optical fiber strands 220, as well as the thickness of the strands can vary considerably to achieve the lighting effects of the user or installer.

In the preferred embodiment, locking cap 40 and base 80 are tapped and threaded, as shown by threads 81, respectively so that locking cap 40 may be loosened or tightened in a rotating screw type relation with base 80. To position spot light 160, locking cap 40 is loosened and the spotlight 160 is rotated to a desired position. Then, locking cap 40 is tightened to grip the rotatable element 60 and secure it into position. To facilitate better gripping of rotatable element 60, the inner walls 210 and 212 of the base 80 and locking cap 40, respectively, may be angled straight or curved. When the rotatable element 60 is spherical, as is shown in FIG. 2, the inner walls 210 and 212 will advantageously be tapered or otherwise curved to fit onto the exterior surface of the rotatable element 60 so as to promote better gripping. Base 80 can be secured to housing 20 by a variety of mechanisms including a threaded fitting, adhesive fitting, swaging, brazing, etc., or the base can be an integral part of housing 20.

The locking cap 40 and base 80 provide a gripping action on rotatable element 60 by translating the locking cap 40 toward or away from base 80. However, it will be understood by those of skill in the art that the translation of the locking cap 40 may be accomplished by other means such as by the use of snap fittings or other fasteners. What is required by this invention is to have a locking cage 170 which alternatively allows loosening to permit free movement of rotational element 60, and tightening to fix the rotational element 60 in position once the optical fiber strands 220 are pointed at an intended target. The ability to lock the rotational element 60 in place in the locking cage 170 prevents drifting of the beam direction (as would occur with mere frictional engagement) which might occur over time or via unintended contact with the light assembly (e.g., bumping or jostling the light assembly). The locking cap 40 can be removable from base 80 (which can assist in the fabrication of the light assembly 10); however, provisions can be made to secure the cap 40 to the base. All that is required is the ability to translate the cap 40 on the base 80 so as to alternately allow rotation of the rotational element 60 or gripping of the rotational element 60. The external surface 42 of locking cap 40 can be textured (e.g., knurled) to provide easier gripping by an installer for loosening and tightening the cap 40 and/or for aesthetic purposes.

FIG. 2 also shows that the optical fibers 220 can be bundled together as a unit 222. Bundling is not required, but will assist in the neat and orderly installation of the optical fibers 220 within the housing. The bundle 222 may include a sheath or could simply be optical fibers intertwined around one another. In addition, within the housing 20, the bundle 222 can be curled, looped, or otherwise present in a slight excess at the site of each rotating element 60 so that there will be sufficient "play" or "slack" thereby permitting easy and free rotatability of the rotational element 60.

Figure 3:
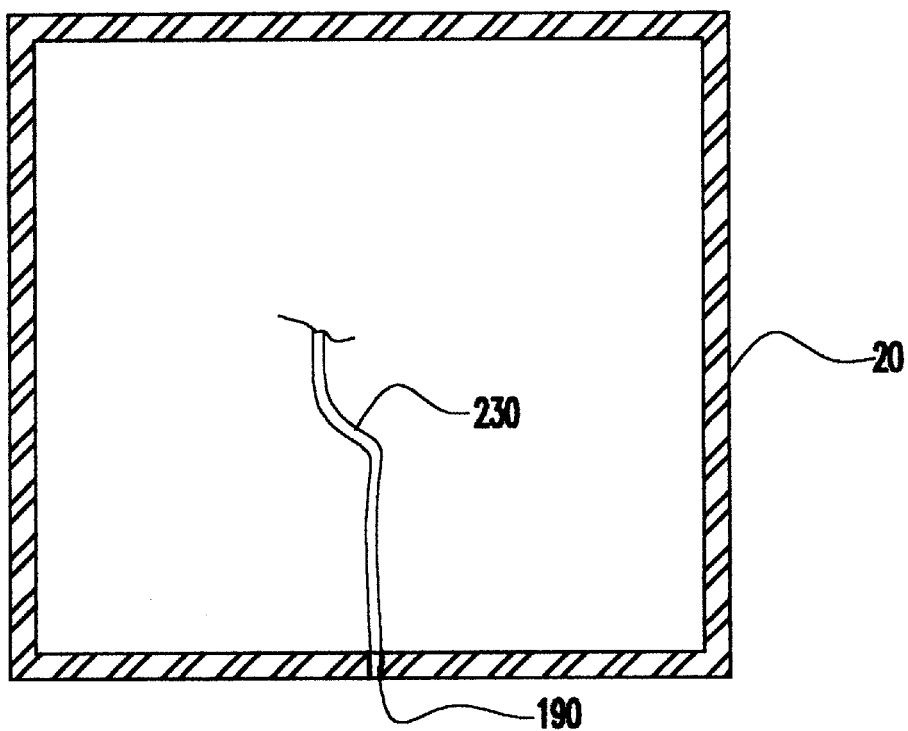
FIG. 3 is a cross-sectional view of the light bar of FIG. 1 taken along line 2—2.

FIG. 3 shows a hole 190 which contains a fiber optic strand 230 secured thereto. The fiber optic strand is cut flush with the housing surface. The fiber optic strand 230 preferably has a diameter of approximately 0.03 inches; however the diameter can vary depending on the needs of the lighting assembly 10. The end of the fiber optic strand 230 can be polished. This configuration comprises one wash lighting node 120. The number of nodes 120 can be varied to obtain the desired amount of wash lighting. The washing light node 120 is intended to provide general background lighting from the lighting assembly 10. It will be understood by those of skill in the art that in certain applications the lighting assembly 10 can be configured with no washing light node 120 in the housing 20.

While the invention has been described in terms of its preferred embodiments, those skilled in the art will recognize that the invention can be practiced with modification within the spirit and scope of the appended claims.

We claim:

1. A fiber optic illumination device, comprising:

a housing with a plurality of apertures;

a plurality of rotatable elements positioned in said apertures of said housing, each of said rotatable elements having a bore therethrough;

a first plurality of fiber optic strands positioned in said housing, each fiber optic strand in said first plurality of fiber optic strands being positioned in a bore of one of said plurality of rotatable elements; and a locking cage surrounding each of said rotatable elements at each aperture, wherein said locking cage comprises a threaded cap and a threaded base, and wherein said base extends from said housing and said cap is translatable longitudinally on said base, said rotatable element being selectively rotatable within said locking cage to orient said fiber optic bundle extending through said bore at a desired orientation, and wherein said threaded cap is rotated about said threaded base to hold said rotatable element in said desired orientation.

2. The fiber optic illuminating device of claim 1 wherein said cap has a textured exterior surface.

3. The fiber optic illuminating device of claim 1 wherein said base is joined to said housing by a screw fitting.

4. The fiber optic illumination device of claim 1 wherein said base is integral with said housing.

5. The fiber optic illumination device of claim 1 wherein said cap and said base are separable.

6. The fiber optic illumination device of claim 1 wherein said rotatable elements are spherical.

7. The fiber optic illumination device of claim 1 wherein said locking cage comprises a cap and a base, and wherein said base extends from said housing and said cap is translatable longitudinally on said base, and wherein each of said cap and said base include interior surfaces which abut against said rotating element.

8. The fiber optic illumination device of claim 7 wherein said interior surfaces are tapered.

9. The fiber optic illumination device of claim 7 wherein said interior surfaces are curved.

10. The fiber optic illumination device of claim 1 further comprising a casing positioned in said bore of said rotatable element.

11. The fiber optic illumination device of claim 10 wherein said casing is cylindrical.

12. The fiber optic illumination device of claim 10 wherein said casing partially extends out of said bore in said rotatable element.

13. The fiber optic illumination device of claim 1 wherein said housing includes a plurality openings and further comprising a second plurality of fiber optic strands, each fiber optic strand of said second plurality of fiber optic strands being positioned in an opening of said plurality of openings and having an end cut flush with said housing.

14. The fiber optic illumination device of claim 13 wherein said plurality of openings and said plurality of apertures in said housing are positioned on a common surface of said housing.

15. The fiber optic illumination device of claim 1 wherein thirty to sixty fiber optic strands of said first plurality of fiber optic strands are positioned in said bore in said rotatable element.

* * * * *